United States Patent
Kawanishi (10) Patent No.: US 10,300,579 B2
(45) Date of Patent: May 28, 2019

(54) GRINDING COOLANT SUPPLIER, GRINDING SYSTEM AND GRINDING METHOD

(71) Applicant: NTN CORPORATION, Osaka (JP)

(72) Inventor: Hiroyuki Kawanishi, Kawachinagano (JP)

(73) Assignee: NTN CORPORATION, Osaka (JP)

( * ) Notice: Subject to any disclaimer, the term of this patent is extended or adjusted under 35 U.S.C. 154(b) by 86 days.

(21) Appl. No.: 15/700,811

(22) Filed: Sep. 11, 2017

(65) Prior Publication Data

US 2017/0368662 A1    Dec. 28, 2017

Related U.S. Application Data

(63) Continuation of application No. PCT/JP2016/057866, filed on Mar. 11, 2016.

(30) Foreign Application Priority Data

Mar. 12, 2015  (JP) .................................. 2015-049234

(51) Int. Cl.
| | |
|---|---|
| *B24B 55/03* | (2006.01) |
| *C02F 1/30* | (2006.01) |
| *C02F 1/00* | (2006.01) |
| *B24B 55/02* | (2006.01) |

(52) U.S. Cl.
CPC .............. *B24B 55/03* (2013.01); *B24B 55/02* (2013.01); *C02F 1/004* (2013.01); *C02F 1/30* (2013.01)

(58) Field of Classification Search
CPC .................................................... B24B 55/02
See application file for complete search history.

(56) References Cited

U.S. PATENT DOCUMENTS

| | | | |
|---|---|---|---|
| 5,735,729 A | 4/1998 | Kobayashi et al. | |
| 7,572,175 B2 | 8/2009 | Ido | |
| 7,820,066 B2 | 10/2010 | Jeffcoate et al. | |
| 2008/0076339 A1 | 3/2008 | Ido | |

FOREIGN PATENT DOCUMENTS

| | | |
|---|---|---|
| CN | 2678821 | 2/2005 |
| CN | 101152705 | 4/2008 |
| CN | 104263326 | 1/2015 |
| JP | 7-41754 | 2/1995 |
| JP | 2000-356440 | 12/2000 |
| JP | 2011-174064 | 9/2011 |

OTHER PUBLICATIONS

International Search Report dated Apr. 5, 2016 in corresponding International Patent Application No. PCT/JP2016/057866.
Chinese Office Action dated Sep. 5, 2018 in corresponding Chinese Patent Application No. 201680014543.6.
Extended European Search Report dated Oct. 22, 2018 in European Patent Application No. 16761871.9.
English Translation of the International Preliminary Report on Patentability dated Sep. 21, 2017 in corresponding International Patent Application No. PCT/JP2016/057866.

*Primary Examiner* — Ladan Mohaddes (57) ABSTRACT

A grinding coolant supplier configured to supply a grinding coolant to a grinder configured to grind an element of a machine part having a rolling element, the grinding coolant supplier including: a grinding coolant generation apparatus configured to generate a grinding coolant which is a mixture of a water-soluble stock coolant, a first reformed water of which water particles have an average particle size of not smaller than 80 nm and not greater than 150 nm, and a second reformed water of which water particles have an average particle size of not smaller than 5 nm and smaller than 80 nm; and grinding coolant supplying device configured to supply the generated grinding coolant to the grinder.

6 Claims, 6 Drawing Sheets

GRINDING COOLANT SUPPLIER, GRINDING SYSTEM AND GRINDING METHOD

CROSS REFERENCE TO THE RELATED APPLICATION

This application is a continuation application, under 35 U.S.C. § 111(a), of international application No. PCT/JP2016/057866, filed Mar. 11, 2016, which claims Convention priority to Japanese patent application No. 2015-49234, filed Mar. 12, 2015, the entire disclosure of which is herein incorporated by reference as a part of this application.

BACKGROUND OF THE INVENTION

Field of the Invention

The present invention relates to a grinding coolant supplier, a grinding system, and a grinding method for generating and supplying a grinding coolant using a reformed water, during grinding an element of a machine part having a rolling element, such as a rolling bearing, a constant velocity joint, a ball screw, a rolling linear-motion bearing, or the like.

Description of Related Art

In the grinding process, contact between a workpiece and a grindstone causes high temperature resulting in thermal damages of the workpiece and the grindstone. Therefore, the heat is usually dissipated by use of a coolant. Such a coolant is required to have: lubricity for suppressing generation of heat by reducing grinding resistance; and a cooling capability for removing heat from the workpiece and the grindstone. The coolant is roughly classified into two kinds: oil-based coolant and water-soluble coolant.

The oil-based coolant is excellent in lubricity but poor in cooling capability. The water-soluble coolant is excellent in cooling capability but poor in lubricity. The water-soluble coolant is further classified into three kinds: emulsion-type, soluble-type, and solution-type. Among these, a solution-type coolant is selected for a workpiece that receives great thermal influence and a workpiece for which quality accuracy is required. An emulsion-type coolant is selected for a workpiece that requires short processing time. A soluble-type coolant has an intermediate performance therebetween. At present, there is no coolant that has both high lubricity and high cooling capability.

Although not for grinding, a method of diluting a coolant with a reformed water has been proposed with respect to a coolant to be used in cutting (for example, Patent Document 1).

RELATED DOCUMENT

Patent Document

[Patent Document 1] JP Laid-open Patent Publication No. 2011-174064

In any of conventional grinding coolants, the effect of removing heat generated during grinding is still insufficient, and it is difficult to improve the sharpness of the grindstone, to reduce the processing time, to extend the service life of the grindstone, and to improve the processing accuracy.

With respect to a cutting coolant, which is an oil coolant, a method for generating the coolant by using a reformed water is proposed in Patent Document 1 or the like. However, cutting and grinding require different properties of a coolant, and thus, usually, a cutting coolant as is cannot be used in grinding. In the case of cutting, a single blade is always in contact with a workpiece. Therefore, the coolant is required to have lubricity during processing and viscosity for preventing coolant shortage. Thus, an important property required of a cutting coolant is lubricity.

In contrast, in grinding, processing is performed with the grindstone being rotated, the grindstone having numerous cutting edges of abrasive grains which are always new due to autogenous action. Thus, lubricity and viscosity are not required so much. On the other hand, with respect to surface roughness accuracy required at a processed surface, compared to the surface roughness of not less than Ra 0.5 required for the cutting process, a high accuracy of Ra 0.4 µm or lower is required in grinding process for a machine part equipped with a rolling element. However, since grinding process generates higher heat than the cutting process, it is impossible to satisfy the processing accuracy unless thermal expansion is suppressed. Therefore, an important property required of a grinding coolant is cooling capability. Since cutting and grinding respectively require different performances as described above, a cutting coolant as is cannot be used as a grinding coolant.

When the coolant according to Patent Document 1 is used in grinding, the cooling capability is insufficient.

An object of the present invention is to provide a grinding coolant supplier, a grinding system, and a grinding method capable of effectively removing heat generated during grinding, and capable of improving the sharpness of a grindstone, reducing the processing time, extending the service life of the grindstone, and improving the processing accuracy.

SUMMARY OF THE INVENTION

A grinding coolant supplier (supplying apparatus) according to a configuration of the present invention is a grinding coolant supplier configured to supply a grinding coolant to a grinder configured to grind an element of a machine part having a rolling element, the grinding coolant supplier including: a grinding coolant generation apparatus configured to generate a grinding coolant which is a mixture of a water-soluble stock coolant, a first reformed water of which water particles have an average particle size of not smaller than 80 nm and not greater than 150 nm, and a second reformed water of which water particles have an average particle size of not smaller than 5 nm and smaller than 80 nm; and a grinding coolant supplying unit configured to supply the generated grinding coolant to the grinder.

The "particle size" in a reformed water denotes the diameter obtained through a dynamic light scattering method.

The "machine part having a rolling element" denotes a part having a rolling element which is a rolling-contact element, such as a rolling bearing, a constant velocity joint, a ball screw, or a rolling linear-motion bearing. The "element of a machine part" denotes a component, such as a bearing ring, constituting the machine part. The portion to be subjected to grinding processing is, for example, a rolling surface with which the rolling element is in contact, but may be another surface.

According to this configuration, the first reformed water has an average particle size of 80 to 150 nm, and thus has high permeability to the processing point. Thus, cooling effect is easily obtained. The second reformed water has an average particle size of not smaller than 5 nm and smaller than 80 nm, and thus has a further smaller particle size than the first reformed water. Accordingly, the second reformed water has high permeability to the processing point, easily evaporates, and has greater heat-removing effect than the first reformed water. In addition, the second reformed water has higher kinetic energy and more active Brownian motion than the first reformed water, and thus, has higher permeability to the processing point than the first reformed water. Although the first reformed water has lower permeability than the second reformed water, the first reformed water is excellent in lubricity for suppressing generation of heat, with less grinding resistance.

Since cooling is performed by use of the grinding coolant containing the first and second reformed waters having the above-described characteristics, heat generated during grinding can be removed effectively. As a result, the sharpness of the grindstone is improved, and it is possible to reduce the processing time, to extend the service life of the grindstone, and to improve the processing accuracy.

It should be noted that cooling capability that is good to some level can be obtained by use of reformed water having a particle size that is between the particle size of the first reformed water and the particle size of the second reformed water. However, through coexistence of the first reformed water which is excellent in lubricity and the second reformed water which is further excellent in permeability and excellent in cooling capability, both cooling capability and lubricity are further improved.

The second reformed water has higher oxidation-reduction potential than the first reformed water, and thus, if the concentration of the second reformed water becomes high, rust occurs. In contrast, the first reformed water has lower oxidation-reduction potential than tap water, and rust is less likely to occur. Therefore, these waters should be used at a blending ratio in consideration of the particle size, Brownian motion, and likeliness of causing rust. The first reformed water simply can be expressed as just having fine water particles, but has particle size that allows easy penetration and a characteristic that allows easy diffusion of the stock coolant. The second reformed water has a still smaller particle size, and therefore penetrates easily. In addition, the second reformed water has more active Brownian motion due to the fineness and has a role of providing kinetic energy to the entirety of the coolant. The source of this kinetic energy is oxidation-reduction potential. However, since high oxidation-reduction potential causes occurrence of rust, it is necessary to balance the blending ratio between the provision of kinetic energy to the first reformed water and the occurrence of rust.

In the configuration described above and in the configuration described below, the average particle size of the first reformed water is preferably 80 to 120 nm, and more preferably 90 to 110 nm. The average particle size of the second reformed water is preferably 5 to 60 nm, and more preferably 9 to 11 nm.

The grinding coolant supplier may include: mixing device configured to mix the plurality of kinds of liquids to obtain the grinding coolant; stock coolant supplying device configured to supply the water-soluble stock coolant (stock liquid of water-soluble coolant) to the mixing device; first reformed water supplying device configured to supply, to the mixing device, the first reformed water of which water particles have a particle size of 80 to 150 nm; and second reformed water supplying device configured to supply to the mixing device the second reformed water obtained by reforming the first reformed water so as to have a further smaller particle size.

In this configuration, similarly to the configuration described above, grinding is performed by use of a grinding coolant which is a mixture of the stock coolant, the first reformed water having a particle size of 80 to 150 nm, and the second reformed water having a further smaller particle size. Thus, heat generated during grinding can be removed effectively. As a result, the sharpness of the grindstone is improved, and it is possible to reduce the processing time, to extend the service life of the grindstone, and to improve the processing accuracy.

The grinding coolant supplier having any one of the above-described configurations includes:

a mixing device configured to mix a plurality of liquid species to obtain a grinding coolant;

a stock coolant supplying device configured to supply a water-soluble stock coolant to the mixing device;

a first reformed water supplying device configured to supply a first reformed water to the mixing device; and a second reformed water supplying device configured to supply a second reformed water to the mixing device, wherein the first reformed water supplying device includes: a primary filter filled with a porous ore having a chemical composition containing 73 to 77% of $SiO_2$, 13 to 15% of $Al_2O_3$, 1 to 2% of CaO, 0.65 to 0.77% of MgO, and 7.3 to 9% of the other components; a secondary filter filled with ceramic balls generated from the porous ore having the chemical composition; and water supplying device configured to cause water to pass sequentially through the primary filter and the secondary filter, and the second reformed water supplying device includes: a filter filled with ceramic balls supporting nano-silvers and generated from the porous ore having the chemical composition; and water supplying device configured to cause water to pass through the filter.

The ore is a porous natural ceramic. By pressurizing water to pass through the ore, the water particles are made into nano-level fine particles, whereby the interfacial tension is lowered and permeability is improved. Where the first reformed water supplying device and the second reformed water supplying device using the filters with such fillers are provided, grinding is performed by use of the grinding coolant containing a mixture of the first reformed water and the second reformed water having the above-described particle sizes. Thus, heat generated during grinding can be removed effectively. As a result, the sharpness of the grindstone is improved, and it is possible to reduce the processing time, to extend the service life of the grindstone, and to improve the processing accuracy. As the ore, a porous ore having a rhyolite composition, i.e., a porous rhyolite referred to as Kohga stone, can be used.

It should be noted that afore-mentioned "nano-silvers" denotes silver particles having a particle size of about 10 nm, for example, about 1 to 20 nm. The afore-mentioned "ceramic ball" is roughly classified into "biscuit body" and "fired body". The biscuit body is obtained by making the ore, i.e., the powder of Kohga stone, into about 7-10 mm spherical shapes, and sintering the resultant sphere-shaped powder at a temperature about 1000° C. to 1500° C. The fired body is obtained by applying a glaze containing the ore, i.e., Kohga stone powder, onto the surface of the biscuit body, and firing the glazed biscuit body at a temperature about 1000° C. to 1500° C.

In the grinding coolant supplier having any one of the above configurations of the present invention, the grinding coolant may include 2 to 5% of the stock coolant, 85 to 93% of the first reformed water, and 5 to 10% of the second reformed water. The percentage of the above proportion is described in percent by volume.

It has been confirmed through tests that most effective cooling is realized during grinding process where the ratio among the stock coolant, the first reformed water, and the second reformed water satisfies the above described proportions.

The grinding system of the present invention includes the grinding coolant supplier having any one of the configurations of the present invention, and the grinder.

According to the grinding system having this configuration, since the grinding coolant supplier of the present invention is used, heat generated during grinding can be removed effectively. As a result, the sharpness of the grindstone is improved, and it is possible to reduce the processing time, to extend the service life of the grindstone, and to improve the processing accuracy.

A grinding method of the present invention is a method for grinding an element of a machine part having a rolling element, the method including: generating a grinding coolant which is a mixture of a water-soluble stock coolant, a first reformed water of which water particles have an average particle size of not smaller than 80 nm and not greater than 150 nm, and a second reformed water of which water particles have an average particle size of not smaller than 5 nm and smaller than 80 nm; and performing grinding by use of the generated grinding coolant.

According to this grinding method, since the grinding coolant obtained by mixing the first reformed water and the second reformed water having the particle sizes in the above-described ranges is used, heat generated during grinding can be removed effectively. As a result, the sharpness of the grindstone is improved, and it is possible to reduce the processing time, to extend the service life of the grindstone, and to improve the processing accuracy.

The second reformed water may be a reformed water obtained by reforming the first reformed water so as to have further smaller water particles.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

In the grinding coolant supplier/grinding system/grinding method of the present invention, a grinding coolant obtained by mixing the first reformed water and the second reformed water having the particle sizes in the above-described ranges is used. Thus, heat generated during grinding can be removed effectively. As a result, the sharpness of the grindstone is improved, and it is possible to reduce the processing time, to extend the service life of the grindstone, and to improve the processing accuracy.

DESCRIPTION OF EMBODIMENTS

A first embodiment of the present invention is described with reference to FIG. 1 to FIG. 5. This grinding coolant supplier is an apparatus which supplies a grinding coolant to a grinder 1. The grinding coolant supplier includes: a mixing device 2 which mixes a plurality of liquid species to obtain a grinding coolant; a stock coolant supplying device 3; a first reformed water supplying device 4; a second reformed water supplying device 5; and a grinding coolant supplying device 6. The mixing device 2, the stock coolant supplying device 3, the first reformed water supplying device 4, and the second reformed water supplying device 5 form a grinding coolant generation apparatus 7. The grinding coolant may be supplied from the grinding coolant supplier to a single grinder (grinding machine) 1 or a plurality of grinders 1.

The grinder 1 is a grinder which grinds an element of a machine part having a rolling element. The machine part having a rolling element is, for example, a rolling bearing, a constant velocity joint, a ball screw, a rolling linear-motion bearing, or the like. The element of the machine part denotes a component of the machine part, and in the case of a rolling bearing, for example, a bearing ring such as an inner ring or an outer ring thereof.

Figure 5:
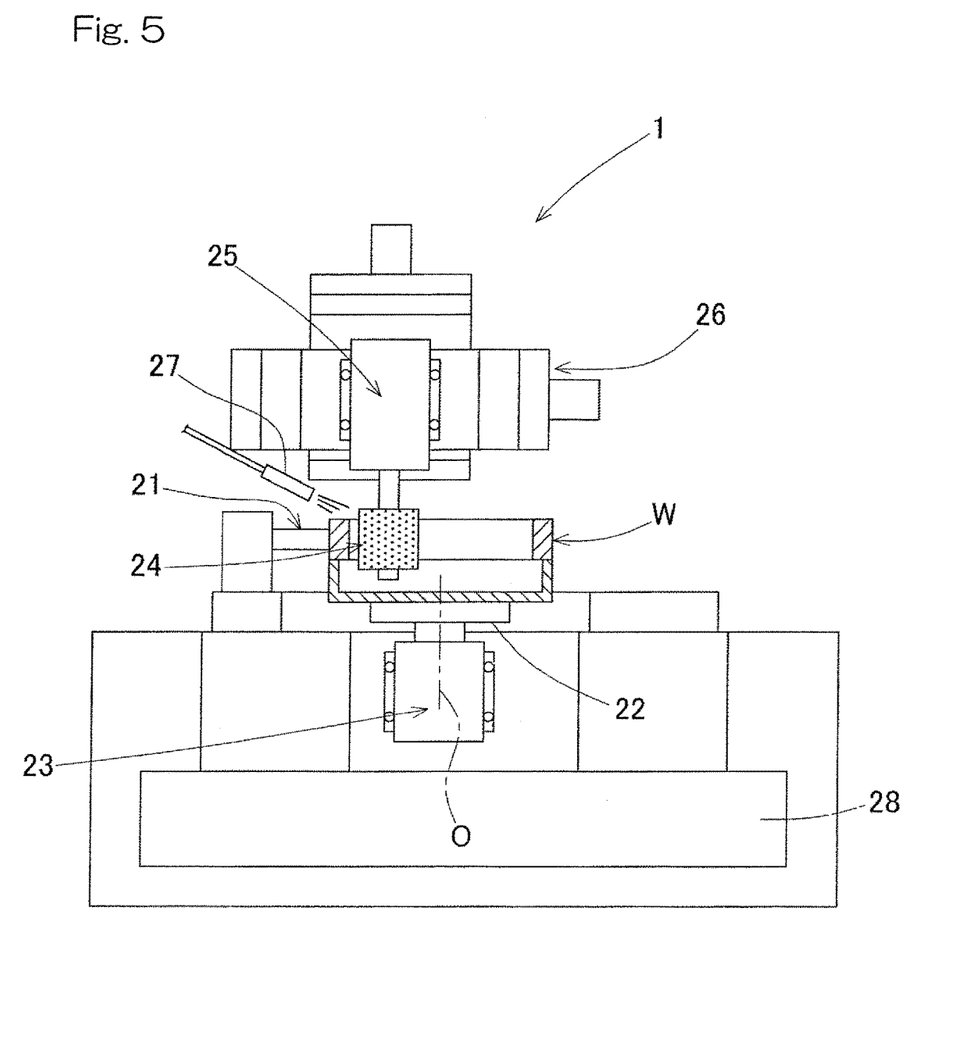
FIG. 5 is a diagram describing an example of a grinding machine.

FIG. 5 shows an example of the grinder 1. The grinder 1 is an apparatus which grinds an inner diameter surface of an outer ring of a rolling bearing, the outer ring being a workpiece W serving as an element of a machine part. In the grinder 1, the workpiece W that is a workpiece to be grinded is supported by a shoe 21, and the workpiece W is rotated by a workpiece driving motor 23 about a center O thereof with a backing plate 22 interposed therebetween. The inner diameter surface which is the raceway surface of the workpiece W is ground by a rotary grindstone 24, while the workpiece W is rotated. The rotary grindstone 24 is rotated by a grindstone driving motor 25. The grindstone driving motor 25 is moved in horizontal two axial directions perpendicular to each other by a grindstone moving mechanism 26. The workpiece driving motor 23 is provided at a base 28. The grinding coolant is discharged from a coolant nozzle 27 to the vicinity of the contact surface of the rotary grindstone 24 with the workpiece W. The grinding coolant is supplied from the grinding coolant supplier shown in FIG. 1.

Figure 1:
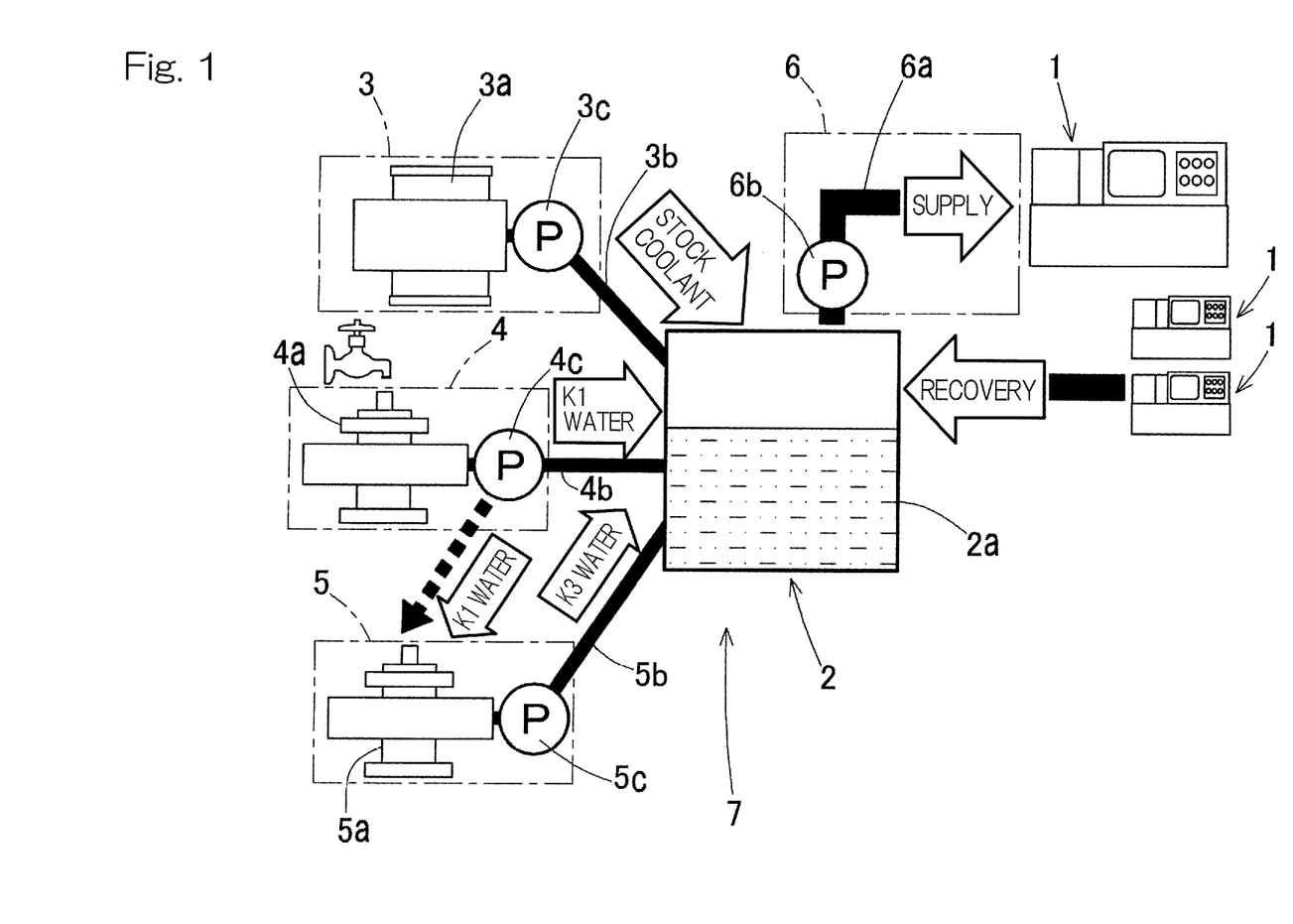
FIG. 1 is a schematic diagram showing a grinding coolant supplier and a grinding system according to a first embodiment of the present invention.

In FIG. 1, the mixing device 2 is implemented as a coolant tank 2a. A stirring device (not shown) may be provided in the coolant tank 2a or at a former stage of the coolant tank 2a.

The grinding coolant supplying device 6 includes a pipe 6a and a pump 6b which send the grinding coolant in the coolant tank 2a to the grinder 1.

The stock coolant supplying device 3 includes a tank 3a which stores therein a water-soluble stock coolant (which may be un-reformed water such as tap water), and a pipe 3b and a pump 3c which send the stock coolant in the tank 3a to the coolant tank 2a.

The first reformed water supplying device 4 includes a first water production device 4a which generates a first reformed water, and a pipe 4b and a pump 4c which send, to the coolant tank 2a, the first reformed water that has been produced. Water serving as a raw material to the first water production device 4a is supplied from a tap water line 8.

The second reformed water supplying device 5 includes: a second water production device 5a which generates a second reformed water; and a pipe 5b and a pump 5c which send, to the coolant tank 2a, the second reformed water that has been produced. Water serving as a raw material to the second water production device 5a is supplied from the first reformed water supplying device 4.

As the first reformed water, water referred to as K1 reformed water may be used, and K1 reformed water is abbreviated as "K1 water" in the drawings. As the second reformed water, water referred to as K3 reformed water may be used, and K3 reformed water is abbreviated as "K3 water" in the drawings. K1 reformed water and K3 reformed water are names according to a certain specification. In the specification, the reformed water is classified into three kinds: K1, K2, and K3, according to the component/configuration as shown in Table 1 below. However, in the grinding coolant supplier according to the present embodiment, K2 reformed water is not used, and K3 reformed water is used as the second reformed water. It should be noted that the first reformed water and the second reformed water may have particle sizes that are different from those of K1 reformed water and K3 reformed water shown in Table 1. The particle sizes shown in Table 1 are average particle sizes.

TABLE 1

| Reformed Water | Component/ Configuration | Effect | Particle size (Tap water: 200 nm) |
|---|---|---|---|
| K1 | Fine water molecule Silica | Base water of K2 and K3 Anti-oxidation (anti-putrefaction) Six-membered ring bond (Stable) | 80 to 100 nm |
| K2 | Ultrafine water molecule Nano-bubble | Permeability, cooling effect Prevention of component cutting edge by cavitation | 50 to 70 nm |
| K3 | Ultrafine water molecule Nano-silver | Permeability, Cooling effect Accelerate Brownian motion by the influence on the charge distribution | 40 to 60 nm |

Figure 2:
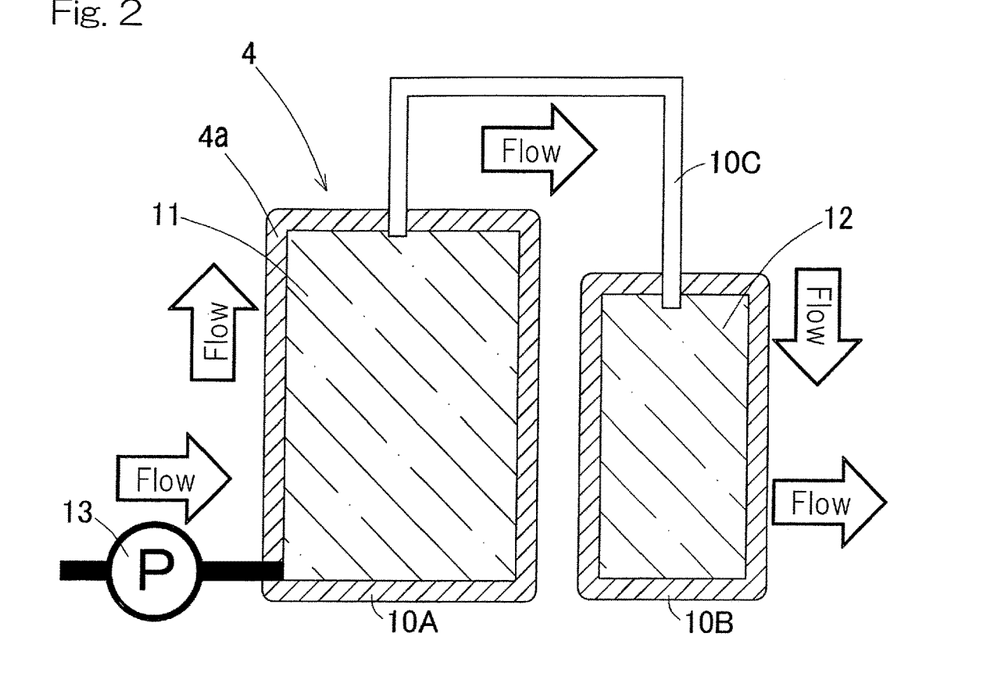
FIG. 2 is a cross-sectional view of a conceptual configuration of first reformed water supplying device in the grinding coolant supplier.

As shown in the conceptual configuration in FIG. 2, the first water production device 4a in the first reformed water supplying device 4 is structured such that: a primary filter 11 and a secondary filter 12 respectively filled in metal containers 10A and 10B are arranged in series via an intermediate passage 10C such as a pipe; and water before being reformed is caused to pass through the filters 11, 12 under pressure by a pump 13. The primary filter 11 is a filter filled with raw stones of a porous ore having a predetermined chemical composition. The secondary filter is a filter filled with ceramic balls generated from the ore. The "ceramic ball" is roughly classified into "biscuit body" and "fired body".

The biscuit body is obtained by making the powder of Kohga stone into about 7-10 mm spherical shapes, and sintering the resultant sphere-shaped powder at a temperature of about 1000° C. to 1500° C. The fired body is obtained by applying a glaze containing Kohga stone powder onto the surface of the biscuit body, and firing the glazed biscuit body at a temperature of about 1000° C. to 1500° C.

Figure 3:
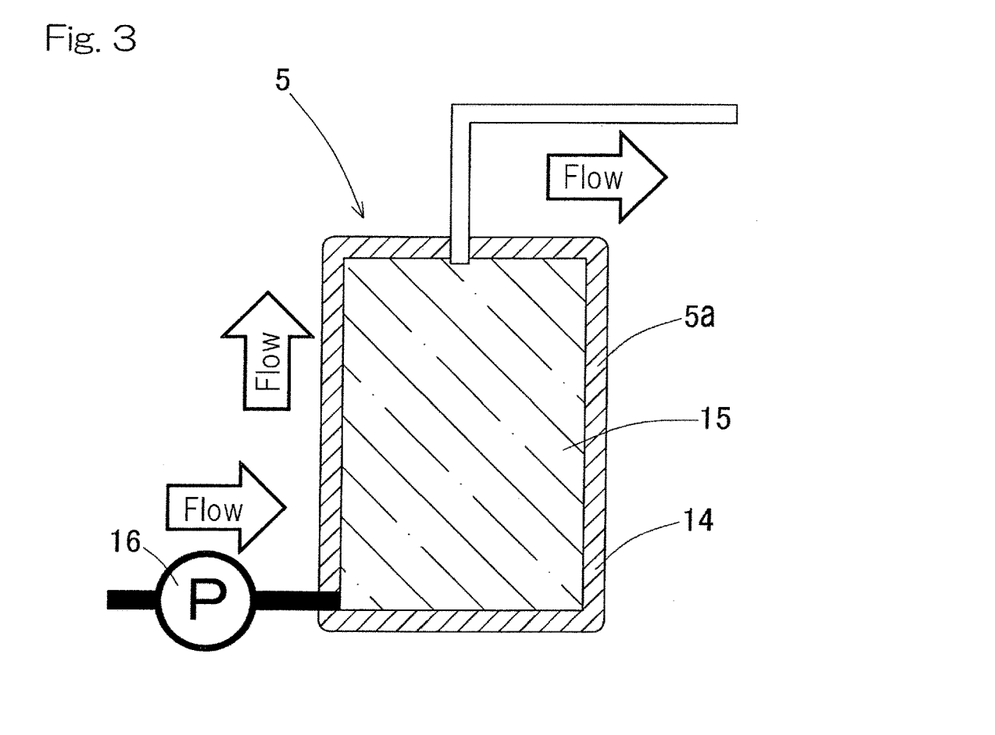
FIG. 3 is a cross-sectional view of a conceptual configuration of second reformed water supplying device in the grinding coolant supplier.

As shown in the conceptual configuration in FIG. 3, the second water production device 5a in the second reformed water supplying device 5 is structured such that: a filter 15 is disposed in a metal container 14; and water before being reformed is caused to pass through the filter 15 under pressure by a pump 16. The filter 15 is filled with ceramic balls supporting nano-silvers and generated from the porous ore having the predetermined chemical composition. Except that the ceramic balls support nano-silvers, the ceramic balls are the same as the ceramic balls used in the first reformed water supplying device 4. The "nano-silvers" denotes silver particles having a particle size of about 10 nm, for example, about 1 to 20 nm.

As the ore having the predetermined chemical composition, Kohga stone such as Amagi Kohga stone is used, for example. Kohga stone is a kind of rhyolite produced in Izu Peninsula in Japan, for example. Kohga stone has a pumice-like structure including micropores formed by firing of obsidian at extremely high temperature due to volcanic eruption, and subsequent rapid cooling of the obsidian causing release of water vapor and gas therefrom. The chemical composition thereof is the above-described predetermined chemical composition containing 73 to 77% of $SiO_2$, 13 to 15% of $Al_2O_3$, 1 to 2% of CaO, 0.65 to 0.77% of MgO, and 7.3 to 9% of other components. The Amagi Kohga stone denotes Kohga stone that is produced in Mount Amagi of Izu Peninsula.

It should be noted that the ore that is used in the filters 11, 12, 15 is not limited to Kohga stone, and may be any porous ore having the chemical composition described above.

The influence on water by the fillers of the primary and secondary filters 11, 12 in the first water production device 4a is described below. The hydrogen bonds of water are cut by infrared radiation (4 to 14 μm) from Kohga stone, whereby, as shown in the images in FIG. 4, tap water before being reformed and having an average particle size of about 200 nm (A of FIG. 4) is made into water of which water molecules (fine water molecules) have an average particle size of about 100 nm, for example, 80 to not greater than 150 nm (B of FIG. 4). The water particles have a specific gravity of not less than 1, gas is released therefrom, and the six-membered ring bond becomes stable. It should be noted that "water particle" here means an aggregate in a shape of a particle composed of water molecules ($H_2O$).

The influence on water by the filler of the filter 15 in the second water production device 5a is described below. When the first reformed water (K1 reformed water) is caused to pass through the second water production device 5a, water particles are made into further finer particles of about 10 nm, for example, about 5 nm to smaller than 80 nm, and due to quantum sieving effect, kinetic energy is increased and Brownian motion of water is promoted (C of FIG. 4).

Figure 4:
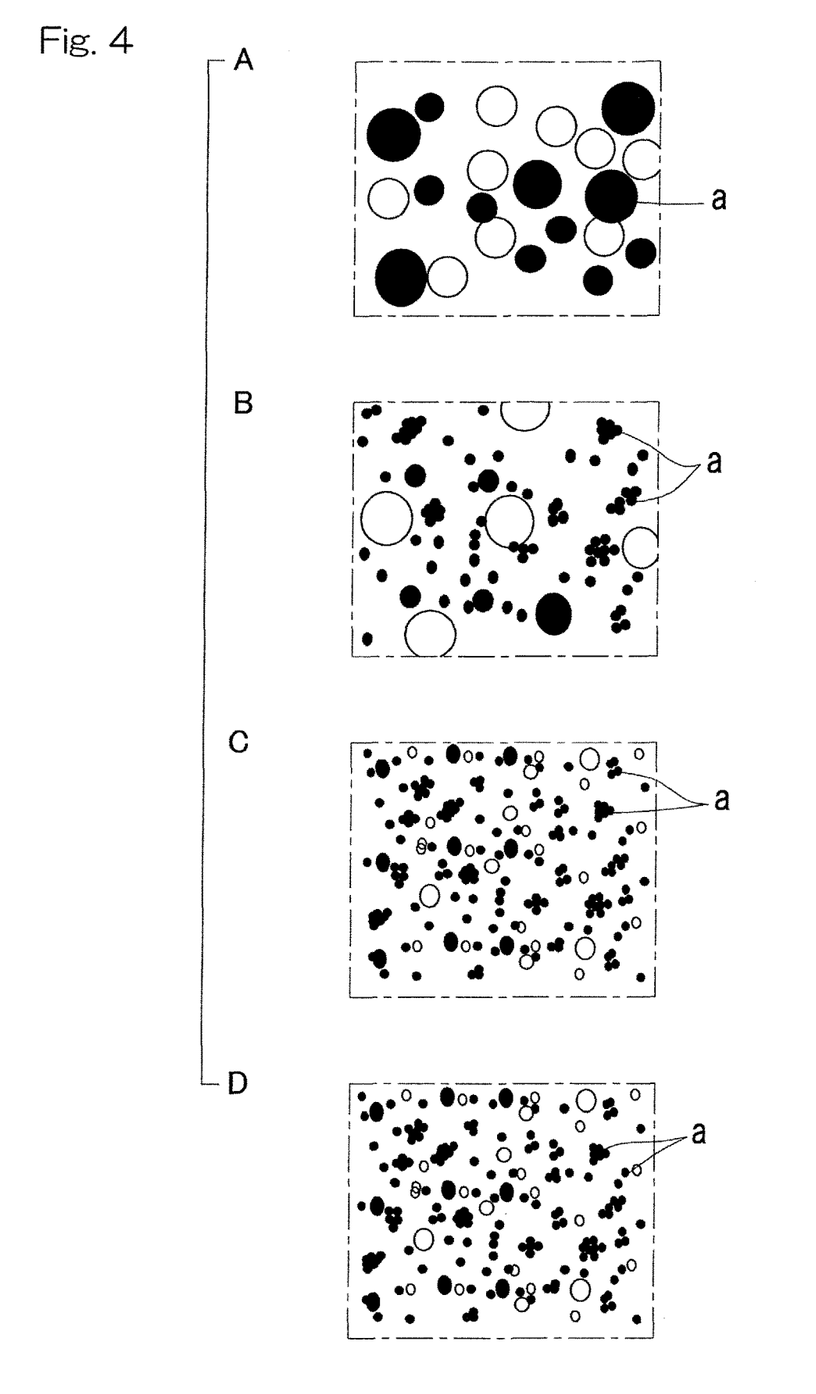
FIG. 4 is a diagram describing the states of water in respective processes in the grinding coolant supplier.

Each of such reformed waters and the stock coolant are mixed together, whereby a grinding coolant as shown in D of FIG. 4 is obtained.

The above-described reformed waters are each explained below.

<First Reformed Water>
Characteristics
Since the particle size is 80 to 150 nm, permeability to the processing point is high, and cooling effect can be obtained easily. The six-membered ring bond is stable, and impurity and gas are less likely to enter. Since the stock coolant is taken into the six-membered ring, water and the stock coolant are less likely to be separated, and thus stabilized.

The average particle size of the first reformed water is preferably 80 to 120 nm, and more preferably about 100 nm, i.e., 90 to 110 nm.

Identification Method

Specific gravity of not less than 1.

Microscopic observation of six-membered ring bond.

The amount of movement of water molecules is small.

<Second Reformed Water>

Characteristics

Since the second reformed water has ultrafine particles having a particle size of 5 to smaller than 80 nm, the second reformed water has high permeability to the processing point, easily evaporates, and has greater heat-removing effect than the first reformed water. The second reformed water has higher kinetic energy and greater Brownian motion than the first reformed water, and thus, has higher permeability to the processing point than the first reformed water.

Identification Method

Specific gravity of not less than 1.

Microscopic observation of six-membered ring bond.

The amount of movement of water molecules is very large.

The average particle size of the second reformed water is preferably 5 to 60 nm, and more preferably 9 to 11 nm.

As the first reformed water and the second reformed water, reformed waters respectively having different zeta potentials may be used.

According to the grinding coolant supplier having this configuration, the first reformed water has a particle size of 10 to 150 nm, and thus has high permeability to the processing point. Thus, cooling effect is obtained easily. The second reformed water has a particle size of 5 nm to smaller than 80 nm, and thus has a further smaller particle size than the first reformed water. Accordingly, the second reformed water has high permeability to the processing point, easily evaporates, and has greater heat-removing effect than the first reformed water. In addition, the second reformed water has higher kinetic energy and more active Brownian motion than the first reformed water, and thus, has higher permeability to the processing point than the first reformed water. Although the first reformed water has lower permeability than the second reformed water, the first reformed water is excellent in lubricity for suppressing occurrence of heat by reducing grinding resistance.

Since cooling is performed by use of the grinding coolant containing the first and second reformed waters having the above-described characteristics, heat generated during grinding can be removed effectively. As a result, the sharpness of the grindstone is improved, and it is possible to reduce the processing time, to extend the service life of the grindstone, and to improve the processing accuracy.

Although capability that is good to some level can be obtained by use of reformed water having a particle size that is between the particle size of the first reformed water and the particle size of the second reformed water, both cooling capability and lubricity are further improved through coexistence of the first reformed water which is excellent in lubricity and the second reformed water which is further excellent in permeability and excellent in cooling capability. In addition, as described above, the second reformed water (for example, K3 reformed water) has higher oxidation-reduction potential than the first reformed water (for example, K1 reformed water), and thus, if the concentration of the second reformed water becomes high, rust occurs. In contrast, the first reformed water has lower oxidation-reduction potential than tap water, and rust is less likely to occur. Therefore, these waters need to be used at a blending ratio in consideration of the particle size, Brownian motion, and rusting tendency.

Figure 7:
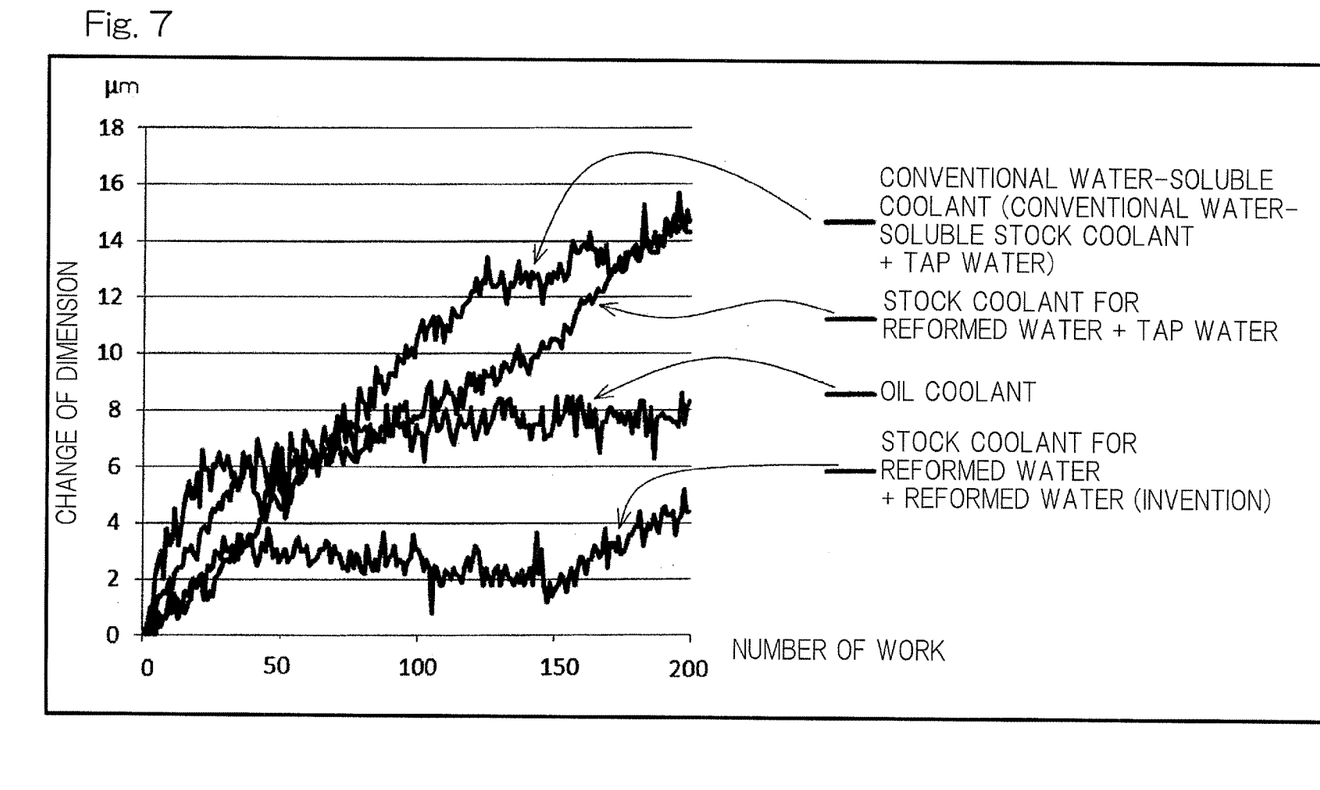
FIG. 7 is a graph comparing, in terms of processing accuracy, the effects of a grinding coolant (reformed water) obtained by the grinding coolant supplier of the embodiment and liquids used as other coolants.

FIG. 7 shows transitions of dimensional change in workpiece contour through grinding by use of a water-soluble coolant (HOKOKU OIL S270 reformed), a tap water coolant (containing, by 2 vol %, HOKOKU OIL CE800 KAI), an oil coolant (HOKOKU OIL GR7), and a grinding coolant (containing, by 2 vol %, HOKOKU OIL CE800 reformed) formed from a reformed water and obtained by the grinding coolant supplier of the present embodiment. In each case, 200 workpieces were subjected to grinding without dressing. As the reformed water, a reformed water produced by use of Amagi Kohga stone as a porous ore was used.

As seen from FIG. 7, in the case of the grinding coolant using the reformed water and produced by the grinding coolant supplier of the present embodiment, even when the processing number is increased, the change in dimensions is smaller than in the case of each of the water-soluble coolant, the tap water, and the oil coolant. Thus, it is considered that, when the grinding coolant using the above-described reformed water is used, the sharpness is maintained with less shedding of the grindstone.

Figure 6:
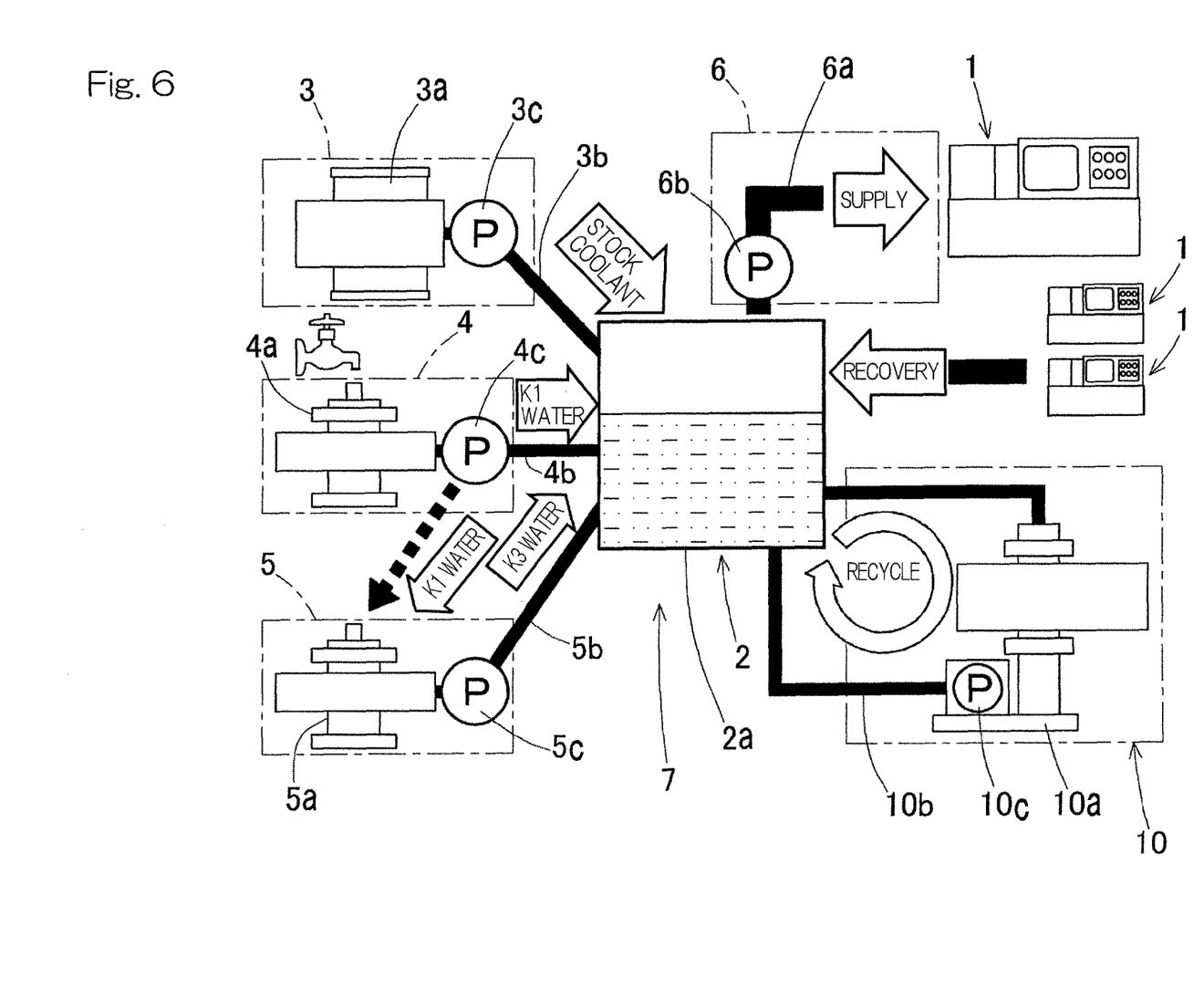
FIG. 6 is a schematic diagram showing a grinding coolant supplier and a grinding system according to another embodiment of the present invention.

FIG. 6 shows another embodiment of the present invention. The present embodiment is configured by adding collection device 9 and reformed water regeneration device 10 to the above-described first embodiment. The collection device 9 is a device which collects the grinding coolant used in grinding process in the grinding machine 1 to return the collected grinding coolant to the coolant tank 2a of the mixing device 2. The collection device 9 includes a pipe and a pump (not shown). The reformed water regeneration device 10 is a device which circulates the grinding coolant in the coolant tank 2a of the mixing device 2 to regenerate the grinding coolant. The reformed water regeneration device 10 includes a reformed water regenerator 10a, a pipe 10b which circulates the grinding coolant between the reformed water regenerator 10a and the coolant tank 2a, and a pump 10c.

The reformed water regenerator 10a is a device which returns the state of the grinding coolant in the coolant tank 2a containing the collected grinding coolant, to a state similar to that of the grinding coolant generated in the second water production device 5a. The reformed water regenerator 10a is configured such that: for example, the secondary filter 12 (see FIG. 2) in the first water production device 4a and the filter 15 in the second water production device 5a (see FIG. 3) are arranged in parallel; and the grinding coolant obtained from the coolant tank 2a (FIG. 6) is branched to be sent into these filters under pressure by a pump (not shown).

In a case where the reformed water regeneration device 10 is provided in this manner, also when the grinding coolant having been used in grinding processing in the grinding machine 1 is collected to be reused, the grinding coolant to be supplied to the grinding machine 1 can be kept in a state where the grinding coolant has the original particle sizes.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

According to the present invention, heat generated during grinding of a workpiece can be removed effectively by use of the coolant in which the first reformed water and the second reformed water are mixed. As a result, the sharpness of the grindstone is improved, and it is possible to reduce the processing time, to extend the service life of the grindstone, and to improve the processing accuracy.

REFERENCE NUMERALS

1 . . . grinder
2 . . . mixing device
2a . . . coolant tank
3 . . . stock coolant supplying device
4 . . . first reformed water supplying device
4a . . . first water production device
5 . . . second reformed water supplying device
5a . . . second water production device
6 . . . grinding coolant supplying device
7 . . . grinding coolant generation apparatus
10 . . . reformed water regeneration device
10a . . . reformed water regenerator
11 . . . primary filter
12 . . . secondary filter
15 . . . filter

What is claimed is:

1. A grinding coolant supplier configured to supply a grinding coolant to a grinder configured to grind an element of a machine part having a rolling element, the grinding coolant supplier comprising:
a grinding coolant generation apparatus configured to generate a grinding coolant which is a mixture of a water-soluble stock coolant, a first reformed water of which water particles have an average particle size of not smaller than 80 nm and not greater than 150 nm, and a second reformed water of which water particles have an average particle size of not smaller than 5 nm and smaller than 80 nm; and
a grinding coolant supplying device configured to supply the generated grinding coolant to the grinder.

2. The grinding coolant supplier as claimed in claim 1, further comprising:
a mixing device configured to mix the water-soluble stock coolant, the first reformed water, and the second reformed water to obtain the grinding coolant;
a stock coolant supplying device configured to supply the water-soluble stock coolant to the mixing device;
a first reformed water supplying device configured to supply the first reformed water to the mixing device; and
a second reformed water supplying device configured to supply to the mixing device the second reformed water obtained by reforming the first reformed water so as to have a further smaller particle size.

3. The grinding coolant supplier as claimed in claim 2, wherein
the first reformed water supplying device includes:
a primary filter filled with a porous ore having a chemical composition containing, in percent by weight, 73 to 77% of $SiO_2$, 13 to 15% of $Al_2O_3$, 1 to 2% of CaO, 0.65 to 0.77% of MgO, and 7.3 to 9% of the other components;
a secondary filter filled with ceramic balls generated from the porous ore having the chemical composition; and
a water supplying device configured to cause water to pass sequentially through the primary filter and the secondary filter, and
the second reformed water supplying device includes:
a filter filled with the ceramic balls supporting nano-silvers and generated from the porous ore having the chemical composition; and
water supplying device configured to cause water to pass through the filter.

4. The grinding coolant supplier as claimed in claim 1, wherein the grinding coolant contains 2 to 5% of the stock coolant, 85 to 93% of the first reformed water, and 5 to 10% of the second reformed water.

5. A grinding system comprising the grinding coolant supplier as claimed in claim 1 and the grinder.

6. A method for grinding an element of a machine part having a rolling element, the method comprising:
generating a grinding coolant which is a mixture of a water-soluble stock coolant, a first reformed water of which water particles have an average particle size of not smaller than 80 nm and not greater than 150 nm, and a second reformed water of which water particles have an average particle size of not smaller than 5 nm and smaller than 80 nm; and
performing grinding by use of the generated grinding coolant.

* * * * *